J. A. STONE.
MOTOR ATTACHMENT FOR HARVESTERS.
APPLICATION FILED AUG. 12, 1911.
1,157,056.
Patented Oct. 19, 1915.
3 SHEETS—SHEET 3.
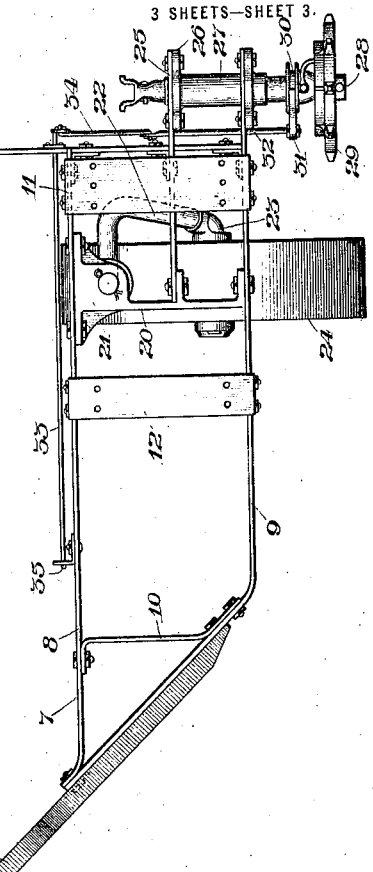
*Fig. 5.*
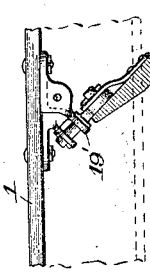
Witnesses.
F.W. Hoffmeister
C.C. Palmer
Inventor.
John A. Stone.
By E.W. Burgess
Attorney

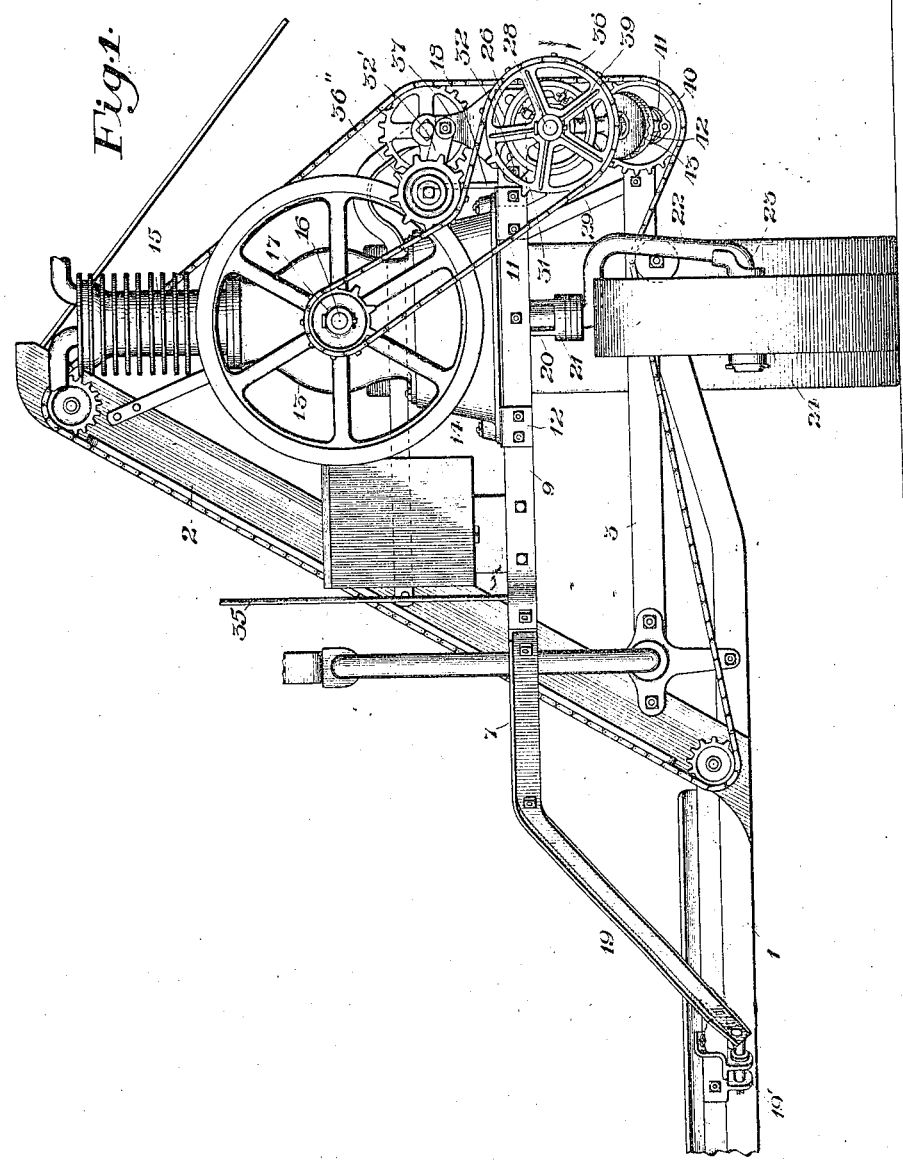

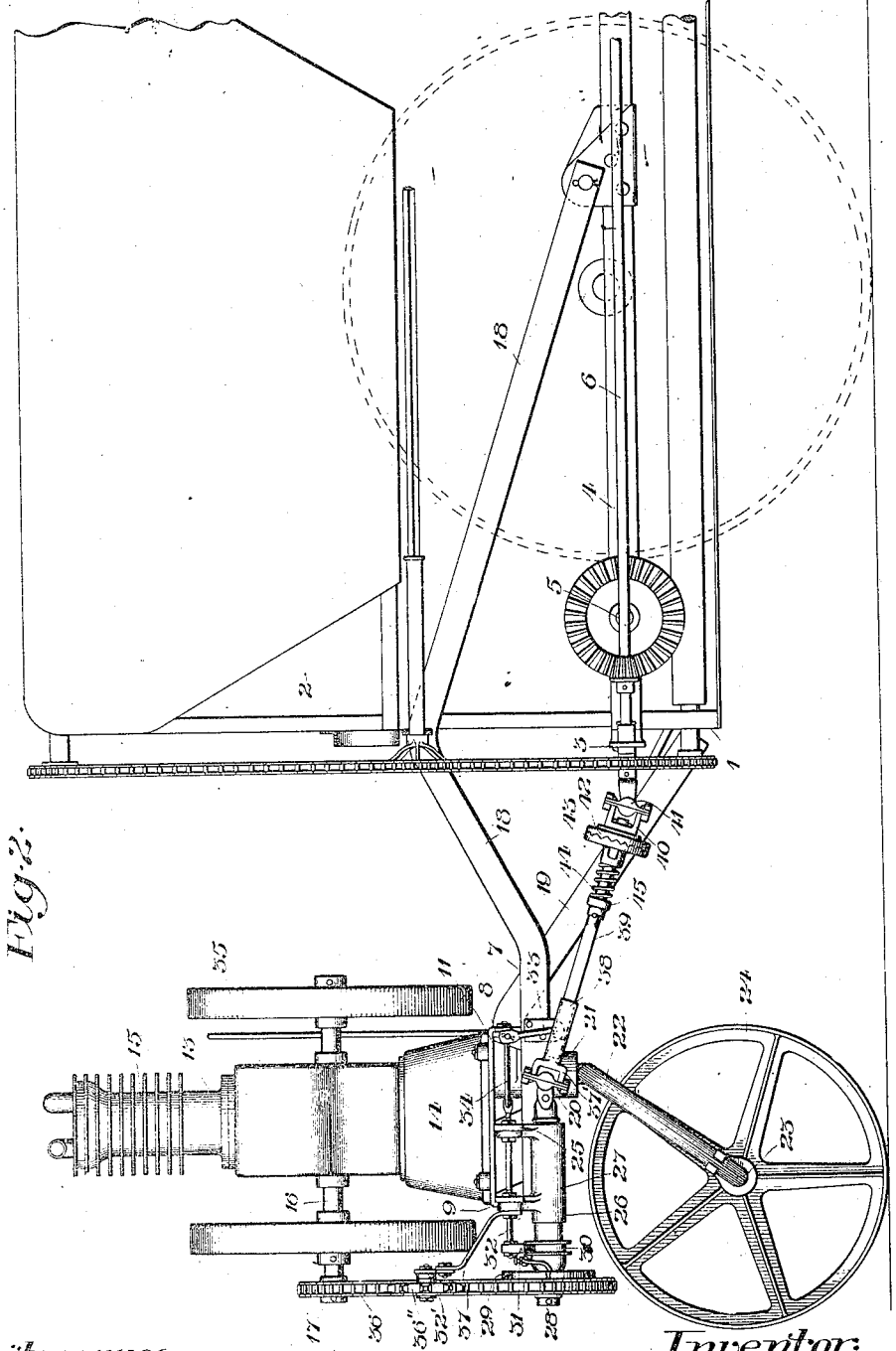

UNITED STATES PATENT OFFICE.

JOHN A. STONE, OF CHICAGO, ILLINOIS, ASSIGNOR TO INTERNATIONAL HARVESTER COMPANY OF NEW JERSEY, A CORPORATION OF NEW JERSEY.

MOTOR ATTACHMENT FOR HARVESTERS.

1,157,056.  Specification of Letters Patent.  Patented Oct. 19, 1915.

Application filed August 12, 1911. Serial No. 643,672.

*To all whom it may concern:*

Be it known that I, JOHN A. STONE, a citizen of the United States, residing at Chicago, in the county of Cook and State of Illinois, have invented certain new and useful Improvements in Motor Attachments for Harvesters, of which the following is a specification.

My invention relates to harvesters, and in particular to the construction and manner of connecting a trailing frame with the frame of a harvester and to the manner of mounting a motor upon the trailing frame whereby power may be transmitted therefrom to operative parts of a harvester; the object of my invention being to provide a motor attachment that may be readily attached to or detached from a harvester, strong in its construction and efficient in operation.

I attain these objects by means of the mechanism illustrated in the accompanying drawings, in which—

Figure 1 represents a rear elevation of a part of a harvester having my improved motor carrying frame connected therewith; Fig. 2 represents a side elevation of Fig. 1; and Fig. 3 is a top plan view of parts of Figs. 1 and 2.

The same reference characters designate like parts throughout the various views.

1 represents a rear sill member of the grain platform of a harvester, 2 a rear member of the elevator structure, 3 a rear transverse member of the traction wheel frame, 4 a longitudinally arranged member thereof, 5 a transverse shaft, and 6 a longitudinally arranged shaft having a driving connection with said transverse shaft, said shafts being mounted upon the wheel frame and hereafter designated as operative parts of the harvester.

7 represents a motor supporting frame arranged in rear of the harvester and including a front sill member 8 and rear sill member 9, having the grainward end thereof inclined forward and grainward and having its end secured to the grainward end of frame member 8, and 10 represents a cross frame member having the opposite ends thereof secured to members 8 and 9 near their grainward ends.

11 represents a motor supporting member secured to the upper sides of the members 8 and 9 near their stubbleward ends, and 12 a similar member secured to the middle of said frame members.

13 represents a motor having a base member 14 secured to members 11 and 12 and including a cylinder 15, an engine shaft 16, and a sprocket wheel 17 secured to the rear end of said engine shaft.

18 represents a motor frame draft member arranged parallel with the line of draft, having its forward end pivotally connected with frame member 4 of the traction wheel frame of the harvester, and its rear end secured to the stubbleward ends of members 8 and 9 of the motor supporting frame.

19 represents a supplemental draft member having its forward end pivotally connected with the rear sill of the grain platform of the harvester by means of a universal coupling mechanism 19′, and inclining rearward and stubbleward is secured at its opposite end to the grainward ends of sill members 8 and 9.

20 represents a bracket member having opposite ends thereof secured to members 8 and 9 intermediate members 11 and 12 and having integral therewith, near its forward end, a vertically arranged sleeve member 21 adapted to loosely receive the vertical stem of a common form of curved caster wheel supporting arm 22 that is provided at its lower end with a longitudinally arranged journal portion 23, upon which is journaled a caster wheel 24. The motor frame member 9 projects at its stubbleward end beyond the draft member 18, and 25 represents a motor frame member intermediate members 8 and 9, having its grainward end secured to bracket member 20 intermediate the ends thereof and member 18, and having its opposite end in line with the stubbleward end of member 9 in the direction of the line of advance of the machine.

26 represents a bracket member secured to the stubbleward ends of the motor frame members 9 and 25 and having a bearing sleeve 27 integral therewith, in which is journaled a countershaft 28 that is arranged in the direction of the line of draft, and having a sprocket wheel 29 loosely journaled upon its rear end and adapted to be clutched therewith by means of a clutch mechanism including a sliding cone 30 that is operatively engaged with a clutch shipping fork 31 secured to the rear end of a sliding rod 32 mounted upon the frame members 9 and 25 and having its forward end connected with a rocking crank shaft 33 by means of a link 34, the rocking crank shaft being supported in bearings at the front side of the motor supporting frame, and having a hand lever 35 integral therewith within convenient reach of the operator from the harvester seat.

36 represents a sprocket chain adapted to transmit motion from the sprocket wheel 17 to the wheel 29, and 32' a chain tightener including a sprocket wheel 36'' and a supporting arm 37.

The forward end of shaft 28 is operatively connected with shaft 6 of the harvester by means including a universal coupling 37' having a sleeve portion 38 that slidably receives the rear end of an angular shaft 39 that inclines downward and forward, and 40 represents a universal coupling member loosely journaled upon the front end of said shaft and operatively connected with a universal coupling member 41 secured to the rear end of shaft 6. The coupling member 40 includes a toothed friction clutch member 42, and 43 represents a corresponding toothed clutch member adapted to engage therewith, slidably mounted upon the shaft 39 and yieldingly held in engagement with member 42 by means of a compression spring 44 encircling the shaft and operative between a collar 45 secured thereto and the hub of member 43.

In operation the trailing motor supporting frame, being flexibly connected with the harvester, permits the latter to be raised or lowered upon the traction wheel, or tilted, as desired, and the caster wheel permits the trailer to accommodate itself to the line of draft of the machine. The flexible connection between the motor and the operative parts of the harvester are such as to insure the transmission of the power of the motor thereto without cramping or undue loss from friction.

What I claim as being my invention, and desire to secure by Letters Patent, is:

1. In a motor attachment for harvesters, a frame comprising a plurality of parallel sill members, a draft member rigidly attached thereto and disposed in a plane at right angles to the same, a second draft member attached to the opposite side thereof and disposed diagonally to said first mentioned draft member, an engine mounted upon said frame, a transport wheel mounted beneath said frame, a power shaft disposed substantially parallel to said first mentioned draft member and journaled in said frame, operative connections between said power shaft and said engine, a clutch intermediate said shaft and said engine, and means for operating said clutch carried by said frame and accessible from the seat of a harvester when said first mentioned draft connection is attached to the stubbleward side thereof and said second mentioned draft member is attached to the frame thereof at a point adjacent the cutting mechanism.

2. In a motor driven harvester, a harvester, a draft link pivotally attached to the stubbleward side thereof and extending rearward thereof, a second draft link pivotally attached to the frame of said harvester at a point intermediate the ends of the cutter frame and extending rearward and stubbleward therefrom, a frame attached to the rear ends of said draft members and disposed substantially in line with the main wheel of the harvester, a source of power mounted on said frame, and a transport wheel pivotally connected beneath said frame disposed in the line of draft and substantially beneath said source of power.

3. In a motor driven harvester, a harvester, a frame, a transport wheel beneath the frame, and operative connections between said harvester and frame whereby one may rise and fall independently of the other including a draft link disposed in the line of draft of said frame, attached thereto and pivotally connected to the stubbleward side of the harvester frame at a point inside the harvester frame and adjacent the axis of the main wheel, said draft link being bowed intermediate its ends.

4. A motor attachment for harvesters including, in combination, a motor supporting frame adapted to trail in rear of a harvester, said frame including front and rear sill members extending transversely relative to the line of draft, a draft member having its rear end secured to the stubbleward ends of said front and rear sill members, said draft member being extended forward parallel with the line of draft and having means at its front end whereby it may be pivotally connected with a harvester, a supplemental draft member having its rear end secured to the grainward ends of said front and rear sill members, said supplemental draft member extending forward and grainward from said motor supporting frame and provided at its front end with a universal coupling mechanism whereby it may be connected with a harvester.

5. A motor attachment for harvesters including, in combination, a motor supporting frame adapted to trail in rear of a harvester, said frame including front and rear sill members extending transversely relative to the line of draft, a draft member having its rear end secured to the stubbleward ends of said front and rear sill members, said draft member being extended forward parallel with the line of draft and having means at its front end whereby it may be pivotally connected with a harvester, a supplemental draft member having its rear end secured to the grainward ends of said front and rear sill members, said supplemental draft members extending forward and grainward from said motor supporting frame and provided at its front end with a universal coupling mechanism whereby it may be connected with a harvester, a bracket member having opposite ends thereof secured to said front and rear sill members intermediate their ends and provided with a vertically arranged sleeve portion, a caster wheel supporting arm having a vertically arranged stem adapted to be received by said sleeve, and a caster wheel journaled upon said arm.

JOHN A. STONE.

Witnesses:
WILLIAM CLARK,
CHARLE J. PISAR.